United States Patent [19]
Sprengel et al.

[11] Patent Number: 5,786,108
[45] Date of Patent: Jul. 28, 1998

[54] ELECTROCHEMICAL CELL

[75] Inventors: Dietrich Sprengel; Jürgen Heydecke, both of Halver; Eberhard Niggemann, Kelkheim, all of Germany

[73] Assignee: Varta Batterie Aktiengesellschaft, Hanover, Germany

[21] Appl. No.: 741,340

[22] Filed: Oct. 29, 1996

[30] Foreign Application Priority Data

Nov. 6, 1995 [DE] Germany ............ 195 41 255.9

[51] Int. Cl.$^6$ ............ H01M 2/30; H01M 2/06
[52] U.S. Cl. ............ 429/178; 429/180; 429/183; 429/211
[58] Field of Search ............ 429/178, 179, 429/180, 183, 211, 238, 239

[56] References Cited

U.S. PATENT DOCUMENTS

| | | | |
|---|---|---|---|
| 1,015,735 | 1/1912 | Heuser | 429/178 |
| 1,371,093 | 3/1921 | Holland et al. | 429/180 |
| 3,956,012 | 5/1976 | Scholle | 429/211 |
| 4,521,498 | 6/1985 | Juergens | 429/59 |
| 5,660,946 | 8/1997 | Kump et al. | 429/173 |

FOREIGN PATENT DOCUMENTS 2220557   12/1972   Germany.
2906853    8/1979   Germany.

OTHER PUBLICATIONS

Abstract of FR-A 2,651,606 (Sep. 7, 1989).

*Primary Examiner*—Stephen Kalafut
*Assistant Examiner*—Carol Chaney
*Attorney, Agent, or Firm*—Weiser and Associates, P.C.

[57] ABSTRACT

A prismatic electrochemical cell includes electrode plate blocks in which the stacked positive and negative electrode plates are separated by separators and are connected by current conductors to the corresponding terminal posts by crimping current conductors in the form of wires to collar-shaped portions of the terminal posts.

13 Claims, 3 Drawing Sheets

ELECTROCHEMICAL CELL

BACKGROUND OF THE INVENTION

The present invention relates to electrochemical cells having prismatic electrode plates in which the positive electrode plates and the negative electrode plates are separated by separators and electrically connected by suitable current conductors to their corresponding terminal posts. Cells of this type are generally known.

DE-A 2,220,557 discloses one such electrochemical cell in which the current conductors of the positive and negative electrode plates are fixed to rods connected to the terminal posts by specially shaped clamping pieces.

DE-A 2,906,853 discloses an electrochemical cell in which two electrode plates of like polarity are connected by a common current conductor. The common current conductors (and in this way, the pairs of electrode plates) are fixed to the corresponding terminal posts by bolts, rivets or welds. The common current conductors are produced either by welding a metal strip to the edges of the two electrode plates or by cutting a metal ribbon from ungrounded regions of the material forming the electrode plate supports and connecting the two electrode plates.

FR-A 2,651,606 discloses a terminal post for an alkaline battery in which strip-like current conductors of the electrode plates are fixed to opposing sides of the terminal post (inside the cell) by spot welding. The terminal post has a square shoulder which is placed in a form-fitting or frictional connection with a correspondingly shaped region on the inside of the cell lid.

However, each of these known designs for the current conductors of electrode plates, and their manner of connection to the terminal posts, have disadvantages which prevent automation of the cell's manufacturing process.

SUMMARY OF THE INVENTION

It is therefore the object of the present invention to provide a connection between the electrode plates and the terminal posts of a prismatic electrochemical cell which permits the automated production of such cells.

This and other objects which will become apparent are achieved in accordance with the present invention by providing the electrode plates of the cell with current conductors which are formed as wires and which are connected to collar-shaped portions of the terminal posts by a crimped connection. The wire-shaped current conductors permit simple mechanical assembly with the collar-shaped receiving portions of the terminal posts, which are themselves easily produced. In addition, the current conductors reduce the initiation of bending moments in the electrode plates, and in combination with the collar shape of the receiving portions of the terminal post, permit a crimped connection capable of achieving a "cold" weld of the resulting assembly. Such crimped connection also tends to yield an electrical connection which has a low electrical (transmission) resistance.

Attachment of the current conductors to the electrode plates is advantageously achieved by flattening the wire-shaped current conductors in the region of connection to the electrode plates, and by connecting the two components by spot, ultrasonic or butt welding. Such connection of the current conductors to the electrode plates is simple, well suited to automation, and in the case of foam, sintered or felt electrodes, permits a high degree of utilization of the available electrode area.

The terminal posts are advantageously provided with a second collar-shaped receptacle, in portions of the terminal post located outside of the cell. This permits an electrically secure connection to other cells (through the lid or through the cell wall) which is capable of automation without the disadvantage of torsional stress on the terminal posts.

For further discussion of the improvements of the present invention, reference is made to the detailed description which is provided below, taken in conjunction with the following illustrations.

DETAILED DESCRIPTION OF PREFERRED EMBODIMENTS

Figure 1:
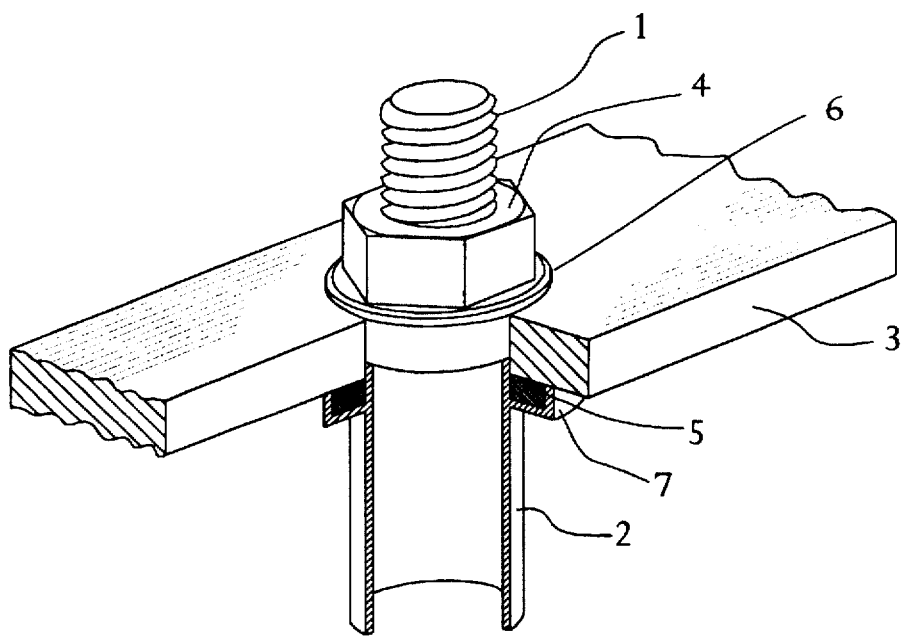
FIG. 1 is a partial, sectioned view of a cell lid fitted with a terminal post having a collar-shaped portion for receiving the current conductors of electrode plates.

FIG. 1 shows a cell construction in which a terminal post 1 has a collar-shaped receiving portion 2 located inside the electrochemical cell. The terminal post 1 is pushed through the cell lid 3, preferably from the inside of the cell. In this way, a sealing ring 5 can be provided in a flange 7 extending from the receiving portion 2, for engagement with the underside of the cell lid 3. A lock washer 6 and a nut 4 are screwed onto the terminal post 1 to complete and secure the resulting assembly in position on the cell lid 3.

Figure 2:
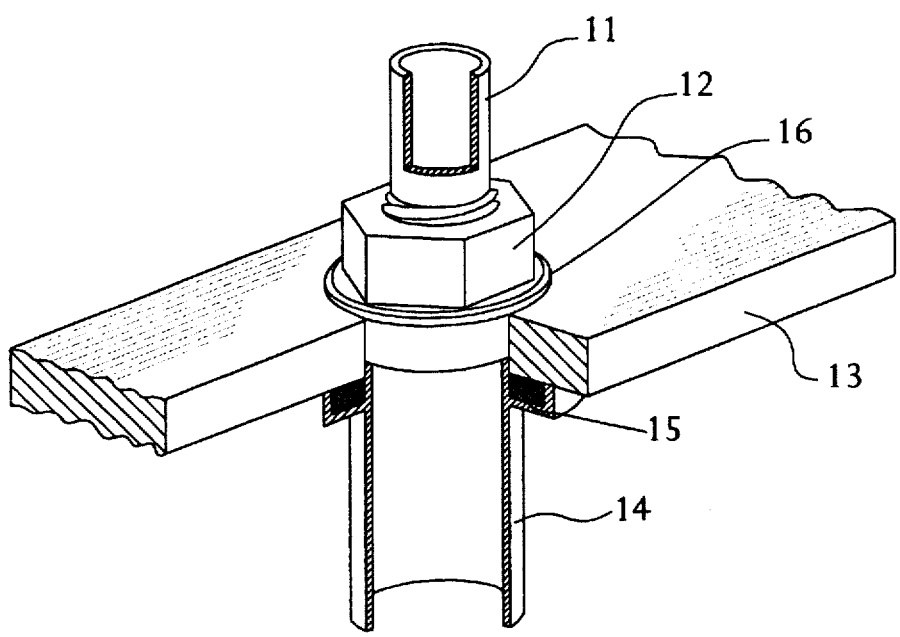
FIG. 2 is a partial, sectioned view of a cell lid fitted with a terminal post having a collar-shaped portion for receiving the current conductors of electrode plates, and a collar-shaped portion for connection with another cell.

FIG. 2 shows an alternative construction for the terminal post, which is suited to the direct connection of two cells (e.g., through an intermediate wall). In this configuration, the terminal post 11 is inserted into an intermediate wall 13 of a multi-cell container, and collar-shaped receiving portions 11, 14 are provided for respectively receiving the current conductors of electrode plates of opposite polarity to develop a series connection of adjacent cells (i.e., a "through-the-wall" connection of the positive electrode plates on one side and the negative electrode plates on the other side of the cell wall). A sealing ring 15 is in this case provided to ensure both a gas-tight and a liquid-tight seal of the cell, and the cell walls. A lock washer 16 and a nut 12 are again used to complete and secure the resulting assembly in position, through the intermediate cell wall 13.

Figure 3:
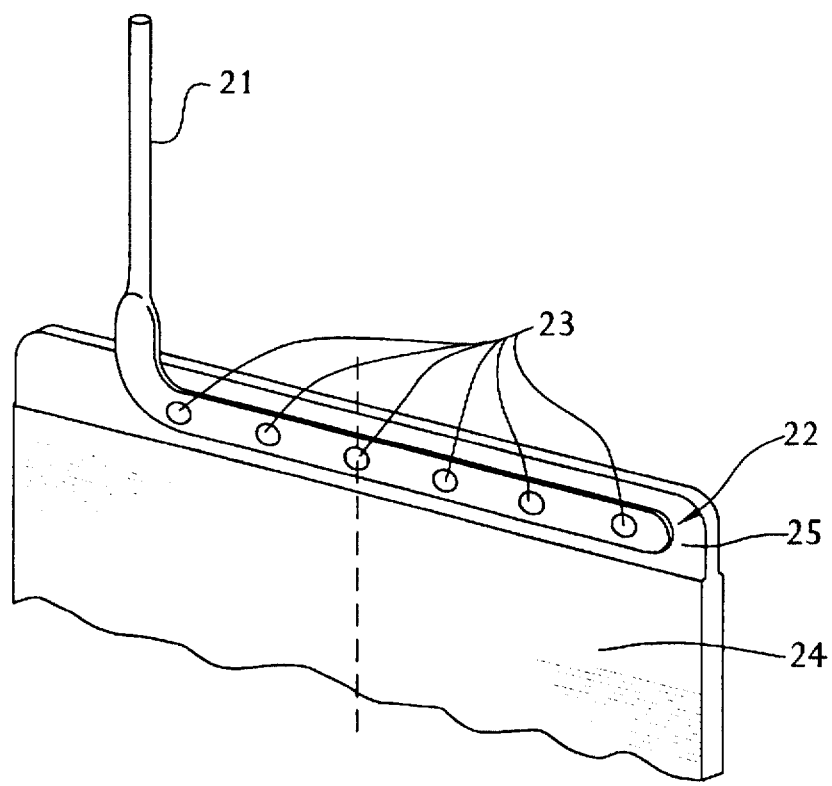
FIG. 3 is an isometric view of a current conductor connected to an electrode plate.
Figure 4:
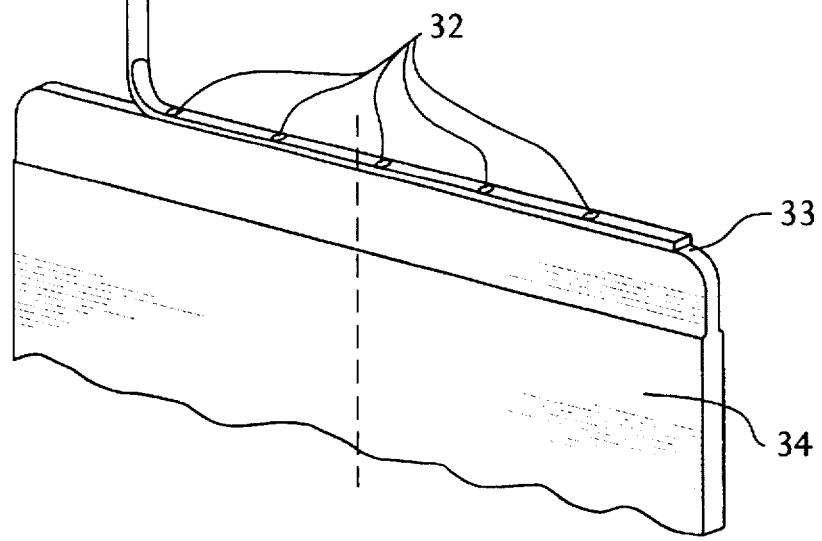
FIG. 4 is an isometric view of an alternative connection of the current conductor to an electrode plate.

FIG. 3 shows an electrode plate 24, and the attachment of a wire-shaped current conductor 21 to the (ungrounded) region 25 of the electrode plate 24. For fiber, sintered or foam electrode support substrates, the region 25 and the wire-shaped current conductor 21 are preferably flattened along their overlap, at 22, and connected by spot welds 23. An alternative manner of connecting a wire-shaped current conductor 31 to an electrode plate 34 is shown in FIG. 4. In this case, the wire-shaped current conductor 31 is butt welded (at 32) to an (ungrounded) edge 33 of the electrode plate 34.

Figure 5:
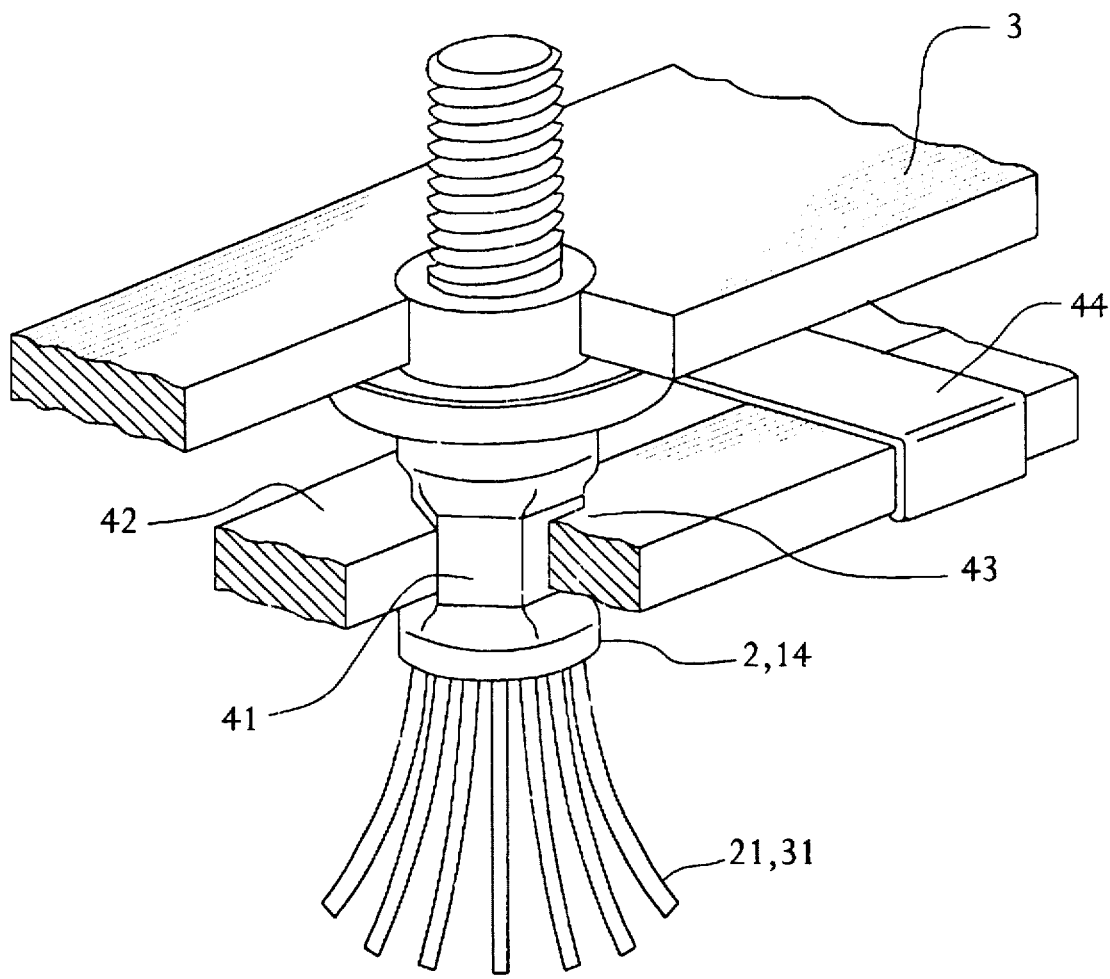
FIG. 5 is a partial, sectioned view of an assembly of the present invention which additionally includes a twist safety shield.

As shown in FIG. 5, the wire-shaped current conductors 21, 31 are connected with the collar-shaped receiving portions 2, 14 by inserting the current conductors into the receiving portion and crimping the receiving portion over the current conductors, preferably defining a regular (geometric) shape. A hexagonal shape is presently preferred, and is shown in FIG. 5.

The resulting cell connection is further advantageously provided with a nonconducting twist shield (formed by abutment 42 and adapter 43) for supporting the terminal post, which is arranged below the cell lid 3. Preferably, the twist shield is frictionally connected to the crimp 41 (the geometric shape) of the terminal post. Cooperation between the crimped connection of the terminal post and the current conductors, and the nonconducting twist shield, ensures the installation of electrode plate sets (groups) without damage. To this end, a supporting abutment 42 and an adapter 43 are inserted over (and into) the crimp 41, in form-fitting manner, and secured with a connecting clip 44 to ensure a form-fitting seating of the adapter 43.

Electrochemical cells incorporating connectors of the present invention are advantageously produced by stacking positive and negative electrode plates (previously fitted with the wire-shaped current conductors) in an alternating manner while inserting separators between the individual electrode plates as the stack is formed, so that the current conductors of the plates of like type (i.e., polarity) all lie to the same side. The current conductors of same polarity are then bunched together, and are preferably adjusted to a uniform length. The current conductors are then inserted into the collar-shaped portion of the terminal post, and the collar-shaped portion is crimped over the current conductors to produce a secure electrical and mechanical connection between such components. This procedure permits (in conjunction with the design of the current conductors and the terminal posts) automated production of the electrochemical cells.

Advantageously, such assembly of the cells can be performed by pushing the terminal posts onto the current conductors, securing the terminal posts and the current conductors (preferably using the form-fitting twist shield), and attaching the terminal posts to the cell lid (e.g., with a nut). As an alternative, the terminal posts can be fixed to the cell lid using a threaded collar ring (using a rivet-like expansion fitted against a terminal post shoulder).

The cell construction of the present invention is especially suitable for alkaline nickel/cadmium or nickel/metal hydride batteries, and also for lithium ion cells.

It will be understood that various changes in the details, materials and arrangement of parts which have been herein described and illustrated in order to explain the nature of this invention may be made by those skilled in the art within the principle and scope of the invention as expressed in the following claims.

What is claimed is:

1. An electrochemical cell comprising a terminal post, and a plurality of electrode plates having current conductors connected with the terminal post, wherein the current conductors are wires, wherein the terminal post includes a collar for receiving the current conductors, and wherein the current conductors are connected to the collar of the terminal post by a crimping.

2. The electrochemical cell of claim 1 wherein the current conductors are connected to the electrode plates by a weld, and wherein the current conductors are flattened along a region connecting the current conductors and the electrode plates.

3. The electrochemical cell of claim 1 wherein the terminal post includes an additional collar receiving the collar which receives the current conductors.

4. The electrochemical cell of claim 3 wherein the plurality of electrode plates include positive plates and negative plates, and wherein the terminal post is a connector extending through an intermediate wall of a multi-cell container, for receiving the current conductors of the positive plates on a first side of the wall and for receiving the current conductors of the negative plates on a second, opposite side of the wall.

5. The electrochemical cell of claim 1 wherein the crimped connection of the collar of the terminal post defines a geometric shape.

6. The electrochemical cell of claim 1 which further includes a nonconducting twist shield engaging the terminal post.

7. The electrochemical cell of claim 6 wherein the cell is enclosed by a cell lid, and wherein the non-conducting twist shield is positioned below the cell lid, in frictional engagement with the crimped connection of the terminal post.

8. A process for producing an electrochemical cell including a terminal post and a plurality of electrode plates including positive plates and negative plates, comprising the steps of:

providing the positive plates and the negative plates with wire current conductors;

alternatingly stacking the positive plates and the negative plates so that the current conductors of plates of same polarity lie on the same side of the stack of plates, while inserting separators between the plates during the stacking;

bunching the current conductors of the plates of same polarity together;

inserting the bunched current conductors into a collar of the terminal post; and crimping the collar over the inserted current conductors, electrically connecting the current conductors and the terminal post.

9. The process of claim 8 wherein the cell is enclosed with a cell lid, and which further includes the step of pushing the cell lid onto the terminal post.

10. The process of claim 8 which further includes the step of securing the terminal post by engaging the collar with a form-fitting twist shield.

11. The process of claim 8 which further includes the step of attaching the terminal post to the cell lid by a nut.

12. The process of claim 8 which further includes the step of attaching the terminal post to the cell lid by a rivet connection.

13. The process of claim 8 which further includes the step of shaping the current conductors to a substantially uniform length before the inserting step.

* * * * *